(12) United States Patent
Kremmer et al.

(10) Patent No.: US 10,098,272 B2
(45) Date of Patent: Oct. 16, 2018

(54) METHOD FOR CALCULATING CHARACTERISTIC GEOMETRICAL OR CONTROL VARIABLES OF A THREE POINT HITCH

(71) Applicant: Deere & Company, Moline, IL (US)

(72) Inventors: Martin Kremmer, Mannheim (DE); Valentin Gresch, Ensheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/788,932

(22) Filed: Oct. 20, 2017

(65) Prior Publication Data
US 2018/0110175 A1  Apr. 26, 2018

(30) Foreign Application Priority Data

Oct. 20, 2016 (DE) .......... 10 2016 220 633
Nov. 23, 2016 (DE) .......... 10 2016 223 189

(51) Int. Cl.
| | |
|---|---|
| *A01C 7/20* | (2006.01) |
| *A01B 63/111* | (2006.01) |
| *B60D 1/01* | (2006.01) |
| *B60D 1/14* | (2006.01) |
| *B60D 1/48* | (2006.01) |

(52) U.S. Cl.
CPC .......... *A01B 63/1117* (2013.01); *B60D 1/01* (2013.01); *B60D 1/141* (2013.01); *B60D 1/48* (2013.01)

(58) Field of Classification Search
CPC ...... A01B 63/1117; B60D 1/01; B60D 1/141; B60D 1/48

USPC .................................................. 280/406.2
See application file for complete search history.

(56) References Cited

U.S. PATENT DOCUMENTS

| | | | | |
|---|---|---|---|---|
| 2004/0215374 A1* | 10/2004 | Shepard | ............ | B60D 1/58 |
| | | | | 701/1 |
| 2014/0249691 A1* | 9/2014 | Hafner | ............ | B62D 13/06 |
| | | | | 701/1 |
| 2014/0303849 A1* | 10/2014 | Hafner | ............ | B62D 13/06 |
| | | | | 701/42 |

(Continued)

FOREIGN PATENT DOCUMENTS

| | | |
|---|---|---|
| DE | 103 50 651 B3 | 5/2005 |
| EP | 2 946 647 A1 | 11/2015 |

OTHER PUBLICATIONS

EP Search Report issued in counterpart application No. 17197240.9 dated 20180314 (6 pages).

*Primary Examiner* — Jacob D Knutson

(57) ABSTRACT

A method is provided for calculating characteristic geometrical or control variables of a three-point hitch for an agricultural tractor in which the hitch includes a lifting strut having a mounting position which is adjustable by means of a lifting arm in one of a plurality of receiving holes formed in a lower link and the hitch is pivotable by the lifting strut. The method includes moving the lower link initially into a horizontal angle position $\alpha=0$ and capturing the corresponding angular position $P_x$, $P_z$ of the lifting arm and a corresponding angular position $\gamma$ of the lifting strut relative to the vertical. The method further includes determining which of the receiving holes satisfies a geometrical constraint condition and determining the mounting position of the lifting strut on the lower link.

7 Claims, 3 Drawing Sheets

(56) References Cited

U.S. PATENT DOCUMENTS

2016/0023525 A1\* 1/2016 Lavoie .................. B60D 1/305
  340/431
2017/0008560 A1\* 1/2017 Kyrtsos ................. B62D 13/06
2017/0073003 A1\* 3/2017 Shepard ................ B62D 13/06
2017/0177973 A1\* 6/2017 Hu ....................... G06K 9/6202

\* cited by examiner

US 10,098,272 B2

METHOD FOR CALCULATING CHARACTERISTIC GEOMETRICAL OR CONTROL VARIABLES OF A THREE POINT HITCH

RELATED APPLICATIONS

This application claims priority to German Application Ser. No. 102016223189.8, filed Nov. 23, 2016, and German Application Ser. No. 102016220633.8, filed Oct. 20, 2016, the disclosures of which are hereby expressly incorporated by reference in their entirety.

FIELD OF THE DISCLOSURE

The present disclosure relates to a method for calculating characteristic geometrical or control variables of a three-point hitch of an agricultural tractor.

BACKGROUND

Common agricultural tractors have three-point hitches arranged in the front or rear area for mounting auxiliary or attached agricultural implements. In order to accommodate different implement types and usage situations, the hitches allow a multitude of adjustment possibilities. The direct adjustment of the three-point hitch is generally undertaken by the operator manually and presumes appropriate practical experience in handling corresponding auxiliary or attached agricultural implements. It is therefore difficult, particularly for inexperienced operators, to assess the adjustment state correctly.

There is a need therefore for a method that allows a calculation of characteristic geometrical or control variables of the three-point hitch and thus, in particular, an operator-independent detection or assessment of the adjustment state of the three-point hitch.

SUMMARY

In one embodiment of the present disclosure, a method for calculating characteristic geometrical or control variables of a three-point hitch for an agricultural tractor provides that a mounting position of a lifting strut, which is adjustable by means of a lifting arm in one of a plurality of receiving holes that are formed in a lower link that is pivotable by means of the lifting strut is determined as the first geometrical or control variable, by bringing the lower link initially into a horizontal angle position $\alpha=0$ and capturing the corresponding angular position $P_x$, $P_z$ of the lifting arm as well as a corresponding angular position $\gamma$ of the lifting strut relative to the vertical and in order to determine the mounting position of the lifting strut on the lower link. It is determined which of the receiving holes satisfies a geometrical constraint condition of the form $$\begin{pmatrix} U_{ix} \\ U_{iz} \end{pmatrix} = \begin{pmatrix} P_x \\ P_z \end{pmatrix} - a \begin{pmatrix} \sin\gamma \\ \cos\gamma \end{pmatrix}$$

in which $U_{ix}$, $U_{iz}$ designate the position coordinates of the i-th receiving hole and a designates a variable representing the length of the lifting strut.

In other words, the associated receiving hole for which the geometrical constraint condition is satisfied is determined by inserting the possible values of $U_{ix}$, $U_{iz}$. Because the geometrical conditions of the three-point hitch permit only a single possible solution of the linear equation provided by the geometrical constraint condition, independently of the actual length $l_h$ of the lifting strut which is represented in the present case by the unknown variable a, an unambiguous identification of the receiving hole used for attaching the lifting strut is possible. The position $P_x$, $P_z$ of the lifting arm in this case is reflected by the position coordinates of an articulation point provided thereon.

Two receiving holes next to one another in the direction of the lower link axis are usually provided on each of the lower links so that different pivoting ranges of the lower links result for each of the two possible attachment positions when the lifting arms are displaced.

The current attachment position can be communicated to the operator, more particularly via an operator terminal arranged in an operator's cab of the agricultural tractor, wherein the additional adjustment information regarding an attachment position of the lifting struts that may be modified if necessary can be provided if the type or model of implement is known.

Proceeding from the determined attachment position of the lifting strut on the lower link, it is then possible to determine the actual or instantaneous length $l_h$ of the lifting strut as the second geometrical or control variable. For this purpose, the position coordinates $U_{jx}$, $U_{jz}$ of the receiving hole identified as being occupied are inserted into the geometrical constraint condition in order to then solve it for the variable a, with $a=l_h$. The knowledge of the actual length $l_h$ of the lifting strut is particularly important if it is designed to be length-adjustable. For this purpose, the lifting strut usually includes two opposite fastening sections, which can be displaced relative to one another by means of a threaded spindle or by oppositely directed threads formed on the sections, a first fastening section being attached to the lifting arm and a second fastening section to the lower link. It should be noted that a hydraulically length-adjustable lifting strut can equally well be used in place of such a mechanical lifting spindle.

In addition, an attachment position of a length-adjustable upper link in one of a plurality of receiving holes of the tractor-side mounting point can be determined as the third geometrical or adjustment variable. The upper link, with an agricultural auxiliary or attached implement in place, is initially brought into one of its two end positions and the angular position $\alpha$ of the lower link and an angular position $\beta$ of the upper link relative to the horizontal in each case are determined in order to determine a mast height $m_i$, proceeding from a length $l_o=\hat{l}_o$ of the upper link in the end position, a length $l_u$ of the lower link and a position $U_x$, $U_z$ of a tractor-side articulation point of the lower link for each of the possible attachment positions of the upper link on the tractor-side mounting point. This mast height is representing a distance between an upper link coupling point and a lower link coupling point for attaching the auxiliary or attached agricultural implement, $$m_i = \sqrt{(M_{ix} - U_{kx})^2 + (M_{iz} - U_{kz})^2},$$

with $$\begin{pmatrix} M_{ix} \\ M_{iz} \end{pmatrix} = \begin{pmatrix} O_{ix} \\ O_{iz} \end{pmatrix} + \hat{l}_o \begin{pmatrix} -\cos\beta \\ \sin\beta \end{pmatrix},$$

-continued $$\begin{pmatrix} U_{kx} \\ U_{kz} \end{pmatrix} = \begin{pmatrix} U_x \\ U_z \end{pmatrix} + 1_u \begin{pmatrix} -\cos\alpha \\ \sin\alpha \end{pmatrix},$$

wherein $M_{ix}$, $M_{iz}$ is a variable representing the position of an upper link coupling point, $U_{kx}$, $U_{kz}$ is the position of a lower link coupling point and $O_{ix}$, $O_{iz}$ are the position coordinates of the i-th receiving hole on the tractor-side mounting point. Then, the position of the lifting arm is varied and the calculation of the mast height $m_i$ is repeated for each of the possible attachment positions of the upper link on the tractor-side mounting point in order to select, from the set of each of the results calculated for the mast height $m_j$, those that indicate, due to their congruence, the receiving hole occupied by the upper link on the mounting point. If the solution is ambiguous, the position of the lifting arm is again changed and the above calculation of the mast height $m_j$ is carried out once again for each of the possible attachment positions of the upper link on the tractor-side mounting point. The results that agree in the two calculations then represent the correct solution $m_j$.

The above-mentioned end position of the upper link corresponds to the fully extended or retracted state thereof, wherein the associated lengths $\hat{l}_o = l_{o,max}$ or $\hat{l}_o = l_{o,min}$ are known, starting from the specifications of the upper link that is in use, so that they are advantageously available for determining the attachment position of the upper link.

In general, three mounting holes are provided on the tractor-side mounting point, and the current attachment position can be communicated to the operator via the operator terminal arranged in the operator's cab of the agricultural tractor. As was already the case for the determination of the attachment position of the lifting struts on the lower links, here too additional adjustment information regarding an attachment position of the upper link that may need to be modified can be obtained with knowledge of the implement type or model mounted on the three-point hitch.

Proceeding from the determined attachment position of the upper link at the tractor-side mounting point, the absolute value of the associated mast height $m_j$ can be immediately determined as the fourth geometrical or control variable, $$m_j = \sqrt{(M_{jx} - U_{kx})^2 + (M_{jz} - U_{kz})^2}.$$

The upper link can then be brought into a working position different from the end position, wherein the length $l_o$ of the upper link in the working position can be determined as the fifth geometrical or control variable by solving a quadratic equation of the form $$m_j^2 = \sqrt{(U_{kx} - O_{jx} + l_o \cos\beta)^2 + (U_{kz} - O_{jz} - l_o \sin\beta)^2},$$

with $$\begin{pmatrix} U_{kx} \\ U_{kz} \end{pmatrix} = \begin{pmatrix} U_x \\ U_z \end{pmatrix} + 1_u \begin{pmatrix} -\cos\alpha \\ \sin\alpha \end{pmatrix},$$

$$\begin{pmatrix} O_{kx} \\ O_{kz} \end{pmatrix} = \begin{pmatrix} O_{jx} \\ O_{jz} \end{pmatrix} + 1_o \begin{pmatrix} -\cos\beta \\ \sin\beta \end{pmatrix},$$

where $\alpha$ is the angular position of the lower link and $\beta$ the angular position of the upper link, each relative to the horizontal, $U_{kx}$, $U_{kz}$ is the position of the lower link coupling point and $O_{jx}$, $O_{jz}$ are the position coordinates of the receiving hole on the tractor-side mounting point that is occupied by the upper link.

The quadratic equation has two solutions, where the correct solution for $l_o$ must lie within the solution space $[l_{o,min}, l_{o,max}]$. If the two solutions are not unambiguous, it is possible to modify the position of the lifting arm and carry out the above calculation for $l_o$ again in order to select those solutions from the set of solutions that indicate, based on their congruence, the actual length $l_o$ of the upper link.

Differing from this, the curve of the angular position $\beta = \beta(l_o)$ of the upper link relative to the horizontal when moving the upper link from the end position toward the working position can be assessed. The curve of the angular position $\beta(l_o)$ has one apex over the entire adjustment range, the correct solution for $l_o$ lying between the end position in question and the apex.

In summary, the calculated characteristic control or geometric variables of the three-point implement hitch involve the attachment position of the lifting strut at the lower link, the instantaneous length $l_h$ of the lifting strut, the attachment point on the tractor-side mounting point, the mast height $m_j$ of the three-point hitch with mounted agricultural auxiliary or attached implement, and the instantaneous length $l_o$ of the upper link. The starting variables $\alpha$, $\beta$, $\gamma$, $P_x$ and $P_z$ necessary for this can be acquired with a few sensors generally already present on the three-point hitch, such as those for angular and position measurements. The remaining parameters $U_x$, $U_z$, $U_{ix}$, $U_{iz}$, $U_{kx}$, $U_{kz}$, $O_{ix}$, $l_u$, $l_{o,max}$ and $l_{o,min}$ follow from the structural properties of the three-point hitch in use and are assumed to be known.

The calculated control or geometrical variables of the three-point hitch can be used particularly for detecting possible maladjustments by the operator and for outputting adjustment recommendations. In addition, it is conceivable to use the variables for the purposes of an automatically performed position or inclination control of the agricultural auxiliary or attached implement by means of the three-point hitch, in which case additional variables such as geo-referenced position information and the like can also be considered.

BRIEF DESCRIPTION OF THE DRAWINGS

The method according to the disclosure for calculating characteristic geometrical or control variables of a three-point hitch for an agricultural tractor will be described in more detail below with reference to the attached drawings. Components that are identical or comparable with respect to their operation are labeled with the same reference numbers, wherein.

DETAILED DESCRIPTION

Figure 1:
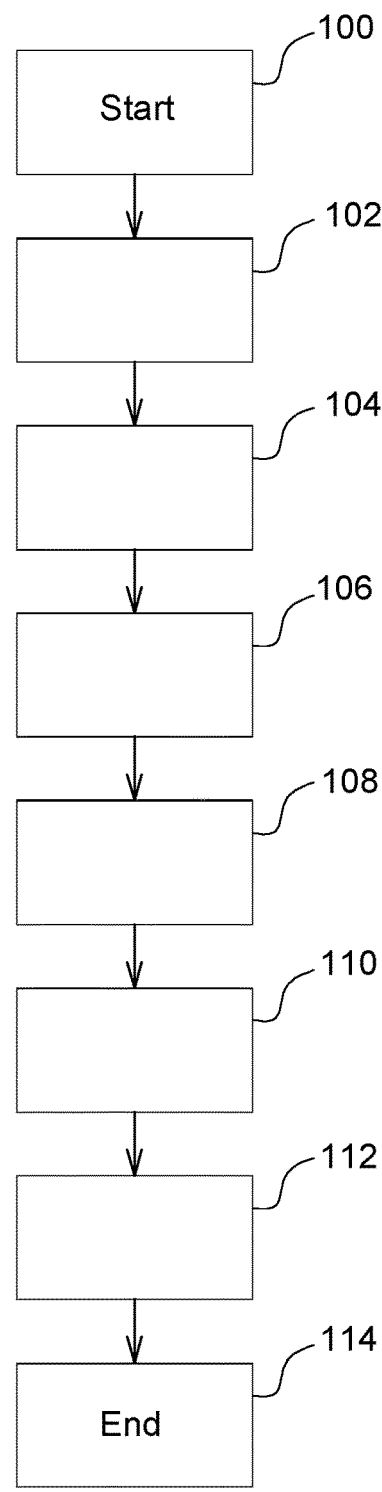
FIG. 1 shows an embodiment of the method according to the disclosure in the form of a flow chart.
Figure 2:
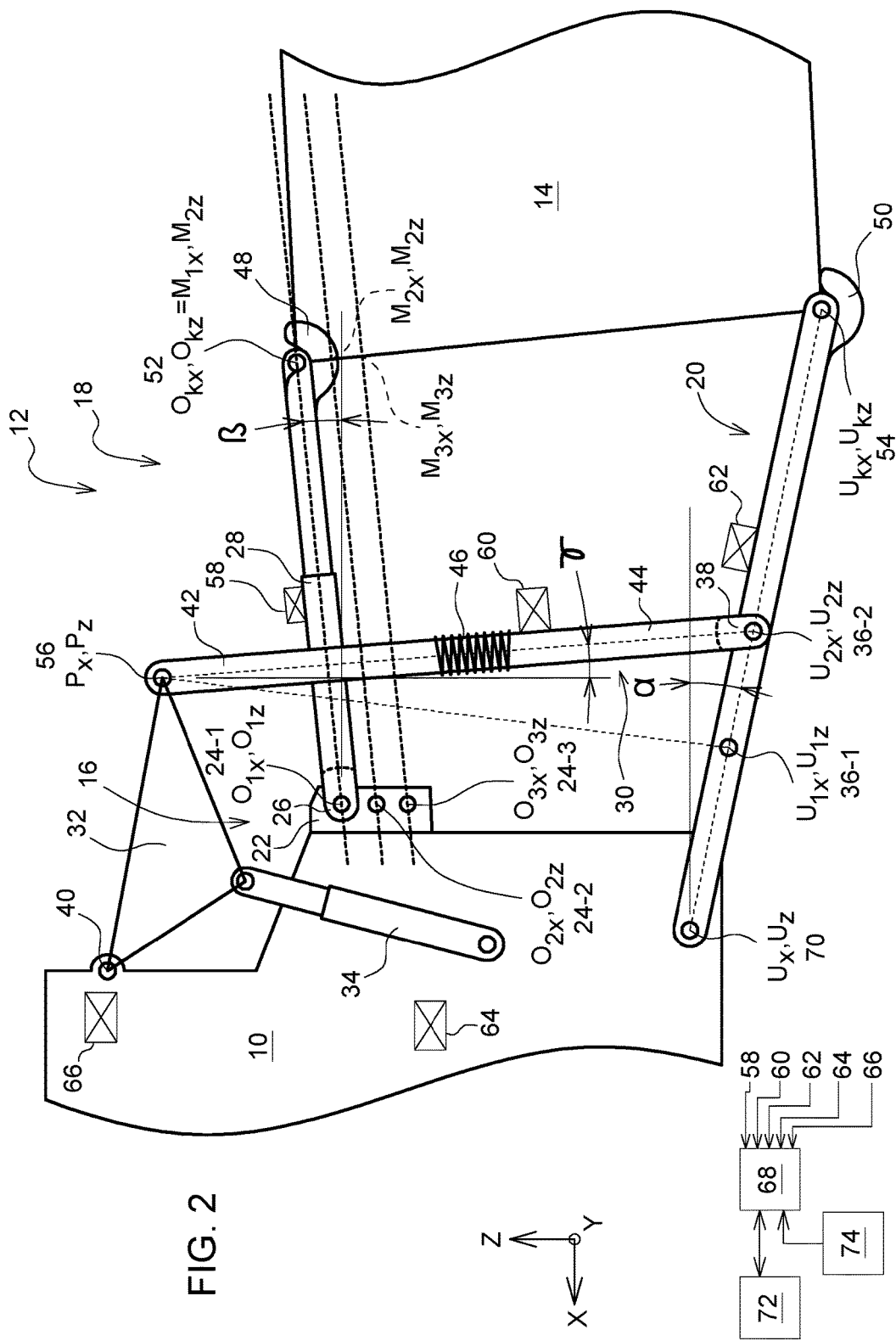
FIG. 2 shows a schematic representation of a three-point hitch on an agricultural tractor with an auxiliary or attached implement mounted thereon.
Figure 3:
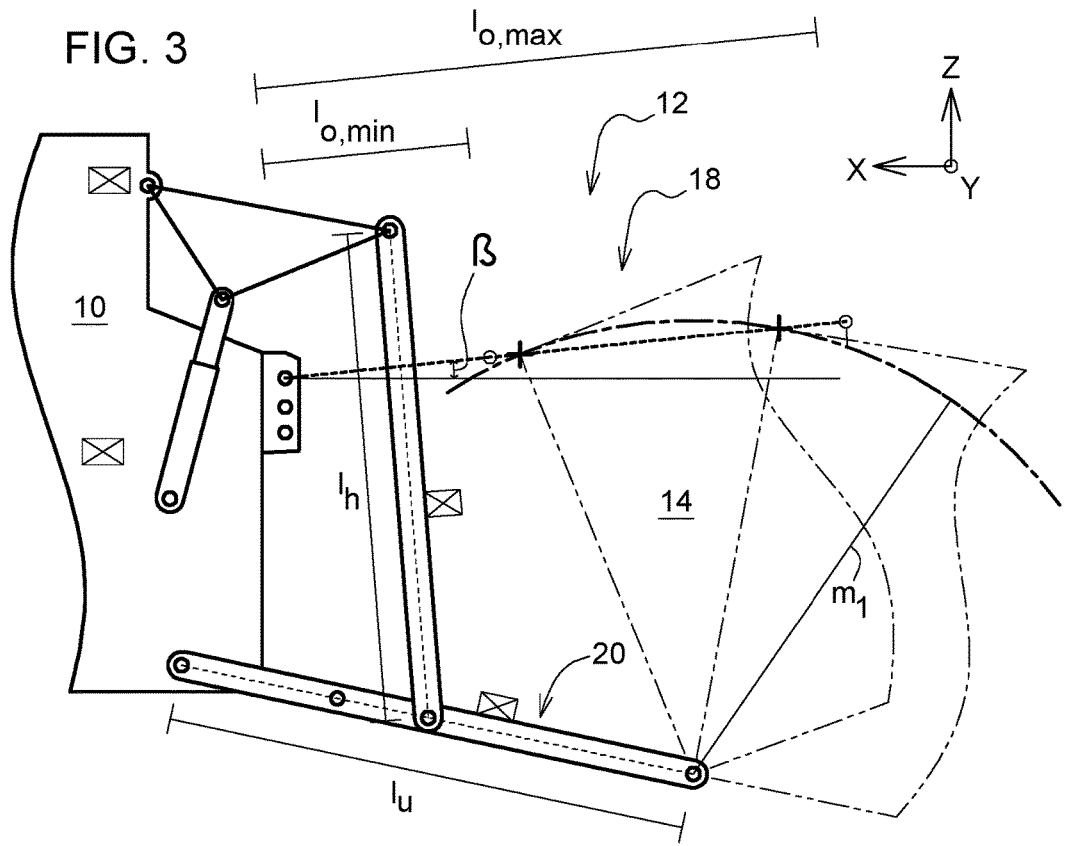
FIG. 3 shows a movement curve of an upper link comprised by the three-point hitch as per FIG. 2 during extension and retraction.

FIG. 1 shows an embodiment of the method according to the disclosure in the form of a flow chart. For better understanding of the methods according to the disclosure and the calculation steps contained therein, the schematic representation as shown in FIGS. 2 and 3 of a three-point hitch 12 in the rear area of an agricultural tractor 10 will be discussed first. An auxiliary or attached implement 14, not further specified, is attached to the three-point hitch 12. This may be a spraying bar, a fertilizer spreader, a rotary windrower, a plow or any cultivation implement.

The three-point hitch 12 has a conventional design and comprises an upper link 18 pivotably attached to a tractor-side mounting point 16, and right-hand and left-hand lower links 20, of which only one is visible in FIG. 2 for pictorial reasons, which are pivotably mounted at opposite sides of the three-point hitch 12.

The tractor-side mounting point 16 is a mounting flange 22. Three receiving holes 24-1, 24-2, 24-3 arranged one above another, to which the upper link 18 can be attached manually by means of a fastening eye 26 formed thereon, are provided on the mounting flange 22. The upper link 18 per se is length-adjustable and for this purpose comprises a hydraulic cylinder 28 communicating with a hydraulic controller (not shown) of the agricultural tractor 10.

The lower links 20 are connected via respective lifting struts 30 to hydraulically pivotable lifting arms 32, the latter being capable of raising and lowering by means of associated hydraulic cylinders 34 actuated by the hydraulic controller of the agricultural tractor 10. Two receiving holes 36-1, 36-2, to which the lifting strut 30 can attached manually by means of a fastening eye 38 formed thereon, are arranged one next to another in the direction of the longitudinal axis on each of the two lower links 20. The lifting arms 32 are connected for conjoint rotation by means of a shaft 40 so that the pivoting movement of the lower links 20 caused by the lifting arms is synchronous.

In addition, the lifting struts 30 are formed to be length-adjustable. For this purpose, each of the lifting struts 30 comprises two opposite fastening sections 42, 44, which can be displaced relative to one another by means of a threaded spindle 46 or oppositely directed threads formed on the sections, a first fastening section 42 being attached to the lifting arm 32 and a second fastening section 44 being attached to the lower link 20.

Catch hooks 48, 50, formed on the upper link 18 and the lower links 20 respectively, allow engagement with corresponding mounting points of the agricultural auxiliary or attached implement 14. This defines a corresponding upper link fastening point 52 and corresponding lower link fastening points 54.

It should be noted at this point that the illustrated number of receiving holes on the tractor-side mounting point 16 or on the lower links 20 have only the character of examples, and the method described below can equally well be applied to arbitrary different numbers of such holes.

It is also conceivable that the three-point hitch 12 can be mounted in the front area of the agricultural tractor 10 rather than in the rear area. The considerations below for calculating the characteristic geometrical or control variables of the three-point hitch 12, particularly in relation to the output variables or parameters that enter into the calculations, must then be appropriately adapted.

In the present case, the output variables that are used are an angular position $\alpha$ of the lower links 20 relative to the horizontal x, an angular position $\beta$ of the upper link 18 relative to the horizontal x, an angular position $\gamma$ of the lifting struts 30 relative to the vertical z and a position $P_x$, $P_z$ of the lifting arms 32, the latter being reflected by the position coordinates of an articulation point 56 of the lifting struts 30 arranged thereon.

The angular positions $\alpha$, $\beta$, $\gamma$ are determined on the basis of measurement data that is provided by associated acceleration or rotational speed sensors 58, 60, 62 and is put into relation with measurement data from a tractor-side acceleration or rotational speed sensor 64. In addition, there is a position sensor 66 for determining the position of the lifting arms 32 and thus the position $P_x$, $P_z$. The measurement data provided by the sensors 58, 60, 62, 64 and 66 is supplied to an electronic control unit 68 for evaluation.

The method running in the electronic control unit 68 for calculating the characteristic control or geometrical variables will now be discussed in detail with reference to FIG. 1.

The method is initialized when the agricultural tractor 10 is put into operation or is initiated by an operator in a starting step 100, whereupon a data transmission connection to the sensors 58, 60, 62, 64 and 66 is established by the electronic control unit 68.

In a second step 102, the attachment position of the lifting strut 30 in one of the receiving holes 36-1, 36-2 provided for that purpose on the lower link 20 is determined. For this purpose, the lower link 20 is first brought by actuation of the hydraulic controller of the agricultural tractor 10 into a horizontal angular position $\alpha=0$, and the corresponding position $P_x$, $P_z$ of the lifting arm 32 and a corresponding angular position $\gamma$ of the lifting strut 30 relative to the vertical are captured. To determine the attachment position of the lifting strut 30 to the lower link 20, it is determined which of the receiving holes 36-1, 36-2 satisfies a geometrical constraint condition of the form $$\begin{pmatrix} U_{ix} \\ U_{iz} \end{pmatrix} = \begin{pmatrix} P_x \\ P_z \end{pmatrix} - a \begin{pmatrix} \sin\gamma \\ \cos\gamma \end{pmatrix} \quad (1.1)$$

in which $U_{ix}$, $U_{iz}$ designate the position coordinates of the i-th receiving hole (i=1, 2) and a designates a variable representing the length of the lifting strut.

In other words, the receiving hole 36-1, 36-2 for which the geometrical constraint condition (1.1) is satisfied is determined by inserting the possible values of $U_{ix}$, $U_{iz}$. Because the geometrical conditions of the three-point hitch 12 permit only a single possible solution of the linear equation provided by the geometrical constraint condition (1.1), independently of the actual length $l_h$ of the lifting strut 30, which is represented in the present case by the unknown variable, a, an unambiguous identification of the receiving hole used for attaching the lifting strut 30 is possible. In the present case, $U_{jx}$, $U_{jz}=U_{2x}$, $U_{2z}$, and thus the lifting strut 30 is mounted in the second receiving hole 36-2 on the lower link 20.

In a third step 104, the actual or instantaneous length $l_h$ of the lifting strut 30 is determined as the second geometrical or control variable, proceeding from the mounting position of the lifting strut 30 on the lower link 20, as determined in step 102. For this purpose, the position coordinates $U_{jx}$, $U_{jz}$ of the receiving hole 36-2 identified as being occupied are inserted into the geometrical constraint condition (1.1) in order to then solve it for the variable a, with $a=l_h$.

In a fourth step 106, the mounting position of the upper link 18 in the receiving holes 24-1, 24-2, 24-3 of the tractor side mounting point 16 is determined as the third geometrical or control variable. For this purpose, the upper link 18, with an agricultural auxiliary or attached implement 14 in place, is initially brought into one of its two end positions. The angular position $\alpha$ of the lower link 20 and the angular position $\beta$ of the upper link 18 are determined relative to the horizontal x in each case in order to determine a mast height $m_i$ proceeding from a length $l_o = \hat{l}_o$ of the upper link 18 in the end position, a length $l_u$ of the lower link 20 and a position $U_x$, $U_z$ of a tractor-side articulation point 70 of the lower link 20. For each of the possible attachment positions of the upper link 18 on the tractor-side mounting point 16, this mast height represents a distance relative to the i-th mounting point (i=1, 2, 3) between the upper link coupling point 52 and the lower link coupling point 54 for attaching the agricultural or attached implement 14, $$m_i = \sqrt{(M_{ix} - U_{kx})^2 + (M_{iz} - U_{kz})^2}, \qquad (1.2)$$

with $$\begin{pmatrix} M_{ix} \\ M_{iz} \end{pmatrix} = \begin{pmatrix} O_{ix} \\ O_{iz} \end{pmatrix} + \hat{1}_o \begin{pmatrix} -\cos\beta \\ \sin\beta \end{pmatrix},$$

$$\begin{pmatrix} U_{kx} \\ U_{kz} \end{pmatrix} = \begin{pmatrix} U_x \\ U_z \end{pmatrix} + 1_u \begin{pmatrix} -\cos\alpha \\ \sin\alpha \end{pmatrix},$$

wherein $M_{ix}$, $M_{iz}$ is a variable representing the position of an upper link coupling point 50, $U_{kx}$, $U_{kz}$ is the position of a lower link coupling point 52 and $O_{ix}$, $O_{iz}$ are the position coordinates of the i-th receiving hole on the tractor-side mounting point 16. Then the position of the lifting arm 32 is varied and the calculation of the mast height $m_i$ is repeated for each of the possible attachment positions of the upper link 18 on the tractor-side mounting point 16 in order to select, from the set of each of the results calculated for the mast height $m_i$, those that indicate, due to their congruence, the receiving hole 24-1, 24-2, 24-3 which is occupied by the upper link 18 on the mounting point 16. If the solution is ambiguous, the position of the lifting arm 32 is again changed and the above calculation of the mast height $m_i$ is carried out once again for each of the possible attachment positions of the upper link 18 on the tractor-side mounting point 16. The results that agree in the two calculations then represent the correct solution $m_j$, $m_j = m_i$ in the present case. Therefore, the upper link 18 is attached at the first receiving hole 24-1 on the tractor-side mounting point 16.

The above-mentioned end position of the upper link 18 corresponds to the fully extended or retracted state thereof, the associated lengths $\hat{l}_o = l_{o,max}$ or $\hat{l}_o = l_{o,min}$ being known from the specifications of the upper link 18 that is in use.

Proceeding from the attachment position of the upper link 18 at the tractor-side mounting point 16, as determined in step 106, the absolute value of the associated mast height $m_j$ is determined in a fifth step 108 as the fourth geometrical or control variable, $$m_j = \sqrt{(M_{jx} - U_{kx})^2 + (M_{jz} - U_{kz})^2}. \qquad (1.3)$$

In a sixth step 110, the upper link 18 is then brought into a working position different from the end position, wherein the length $l_o$ of the upper link 18 in the working position can be determined as the fifth geometrical or control variable by solving a quadratic equation of the form $$m_j^2 = \sqrt{(U_{kx} - O_{jx} + l_o \cos\beta)^2 + (U_{kz} - O_{jz} - l_o \sin\beta)^2}, \qquad (1.4)$$

with $$\begin{pmatrix} U_{kx} \\ U_{kz} \end{pmatrix} = \begin{pmatrix} U_x \\ U_z \end{pmatrix} + 1_u \begin{pmatrix} -\cos\alpha \\ \sin\alpha \end{pmatrix},$$

$$\begin{pmatrix} O_{kx} \\ O_{kz} \end{pmatrix} = \begin{pmatrix} O_{jx} \\ O_{jz} \end{pmatrix} + 1_o \begin{pmatrix} -\cos\beta \\ \sin\beta \end{pmatrix},$$

where $O_{jx}$, $O_{jz}$ are the position coordinates of the receiving hole 24-1 on the tractor-side mounting point 16 that is occupied by the upper link 18.

The quadratic equation has two solutions, and the correct solution for $l_o$ must lie within the solution space $[l_{o,min}, l_{o,max}]$. If the two solutions are not unambiguous, the position of the lifting arm 32 is varied and the above calculation for $l_o$ is carried out again in order to select those solutions from the set of solutions that indicate, based on their congruence, the actual length $l_o$ of the upper link 18.

Figure 4:
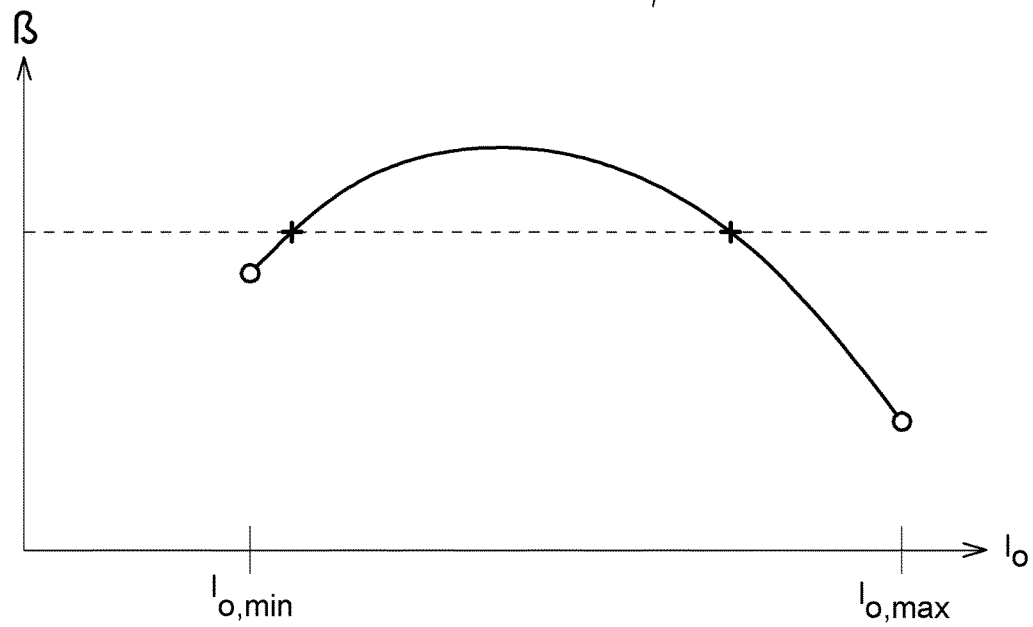
FIG. 4 shows a diagram that indicates the curve of the angular position $\beta$ of the upper link relative to the horizontal as a function of the length $l_o$ of the upper link.

Alternatively, as shown in FIG. 4, it is possible to assess the curve of the angular position $\beta = \beta(l_o)$ of the upper link 18 relative to the horizontal during movement of the upper link 18 from the end position toward the working position, which curve results from the movement curve of the upper link 18 when extending and retracting, as shown in FIG. 3. As can be recognized, the curve of the angular position $\beta(l_o)$ has one apex over the entire adjustment range, the correct solution for $l_o$ lying between the end position and the apex.

The control or geometrical variables for the three-point hitch 12 that are calculated in the second to sixth steps 102 to 110 are used in a seventh step 112 to detect possible maladjustments by the operator and to output adjustment recommendations via a user interface 72 connected to the electronic control unit 68. The user interface 72 is, for example, a touch-sensitive display screen arranged in the vicinity of an operating console of the agricultural vehicle 10. In addition, the calculated control or geometrical variables are used for the purposes of an automatically performed position or inclination control of the agricultural auxiliary or attached implement 14 by means of the three-point hitch 12, in which case additional variables such as geo-referenced position information and the like are also considered.

The variables $U_x$, $U_z$, $U_{ix}$, $U_{iz}$, $U_{kx}$, $U_{kz}$, $O_{ix}$, $O_{iz}$, $l_u$, $l_{o,max}$ and $l_{o,min}$ are parameters that follow from the structural properties of the three-point hitch 12 in use and are therefore assumed to be known. They are stored in a memory 74 that communicates with the electronic control unit 68. The process is then terminated in a final step 114.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for calculating characteristic geometrical or control variables of a three-point hitch for an agricultural tractor, comprising:
   providing the hitch with a lifting strut having a mounting position which is adjustable by means of a lifting arm in one of a plurality of receiving holes formed in a lower link, the hitch being pivotable by the lifting strut;
   moving the lower link initially into a horizontal angle position $\alpha=0$;
   capturing a corresponding angular position $P_x$, $P_z$ of the lifting arm and a corresponding angular position $\gamma$ of the lifting strut relative to a vertical;
   determining which of the receiving holes satisfies a geometrical constraint condition based on $$\begin{pmatrix} U_{ix} \\ U_{iz} \end{pmatrix} = \begin{pmatrix} P_x \\ P_z \end{pmatrix} - a \begin{pmatrix} \sin\gamma \\ \cos\gamma \end{pmatrix}$$

in which $U_{ix}$, $U_{iz}$ designate the position coordinates of the i-th receiving hole and a designates a variable representing the length of the lifting strut; and determining the mounting position of the lifting strut on the lower link.

2. The method of claim 1, further comprising:

forming the lifting strut to be length-adjustable;

determining an instantaneous length $l_h$ of the lifting strut as a second geometrical or control variable;

proceeding from the determined mounting position of the lifting strut on the lower link for which purpose the position coordinates $U_{jx}$, $U_{jz}$ of the receiving hole determined as being occupied are inserted into the geometrical constraint condition in order to then solve the geometrical constraint condition for the variable a with $a=l_h$.

3. The method of claim 1, further comprising:

determining an attachment position of a length-adjustable upper link in one of a plurality of receiving holes of a tractor-side mounting point as a third geometrical or adjustment variable, moving the upper link initially into one of two upper link end positions; and determining the angular position a of the lower link and an angular position β of the upper link relative to the horizontal in order to determine a mast height $m_i$, proceeding from a length $l_o = \hat{l}_o$ of the upper link in an end position, a length $l_u$ of the lower link and a position $U_x$, $U_z$ of a tractor-side articulation point of the lower link for each of the possible attachment positions of the upper link on the tractor-side mounting point, the mast height representing a distance between an upper link coupling point and a lower link coupling point for attaching an agricultural auxiliary or attached implement based on $$m_i = \sqrt{(M_{ix} - U_{kx})^2 + (M_{iz} - U_{kz})^2},$$
with
$$\begin{pmatrix} M_{ix} \\ M_{iz} \end{pmatrix} = \begin{pmatrix} O_{ix} \\ O_{iz} \end{pmatrix} + \hat{1}_o \begin{pmatrix} -\cos\beta \\ \sin\beta \end{pmatrix},$$
$$\begin{pmatrix} U_{kx} \\ U_{kz} \end{pmatrix} = \begin{pmatrix} U_x \\ U_z \end{pmatrix} + 1_u \begin{pmatrix} -\cos\alpha \\ \sin\alpha \end{pmatrix},$$

where $M_{ix}$, $M_{iz}$ is a variable representing the position of the upper link coupling, $U_{kx}$, $U_{kz}$ is the position of the lower link coupling point, and $O_{ix}$, $O_{iz}$ are the position coordinates of the i-th receiving hole on the tractor-side mounting point, wherein the position of the lifting arm is varied and the calculation of the mast height $m_i$ is repeated for each possible position of the upper link on the tractor-side mounting point in order to select those results from the set of results calculated for the respective mast height $m_i$ that indicate, based on the congruence of said results, the receiving hole on the tractor-side mounting point that is occupied by the upper link.

4. The method of claim 3, wherein, if the solution is determined to be ambiguous, the position of the lifting arm is adjusted and the mast height $m_i$ is recalculated for each of the possible attachment positions of the upper link on the tractor-side mounting point.

5. The method of claim 3, wherein, proceeding from the determined attachment position of the upper link at the tractor-side mounting point, an absolute value of the associated mast height $m_j$ is determined as a fourth geometrical or control variable based on $$m_j = \sqrt{(M_{jx} - U_{kx})^2 + (M_{jz} - U_{kz})^2}.$$

6. The method of 5, wherein the upper link is adjusted to a working position different from the end position, wherein the length $l_o$ of the upper link in the working position is determined as a fifth geometrical or control variable by solving a quadratic equation of the form $$m_j^2 = \sqrt{(U_{kx} - O_{jx} + 1_o\cos\beta)^2 + (U_{kz} - O_{jz} - 1_o\sin\beta)^2},$$
with
$$\begin{pmatrix} U_{kx} \\ U_{kz} \end{pmatrix} = \begin{pmatrix} U_x \\ U_z \end{pmatrix} + 1_u \begin{pmatrix} -\cos\alpha \\ \sin\alpha \end{pmatrix},$$
$$\begin{pmatrix} O_{kx} \\ O_{kz} \end{pmatrix} = \begin{pmatrix} O_{jx} \\ O_{jz} \end{pmatrix} + 1_o \begin{pmatrix} -\cos\beta \\ \sin\beta \end{pmatrix},$$

where α is defined as the angular position of the lower link and β is defined as the angular position of the upper link, each defined relative to the horizontal, $U_{kx}$, $U_{kz}$ is the position of the lower link coupling point and $O_{jx}$, $O_{jz}$ are position coordinates of the receiving hole on the tractor-side mounting point that is occupied by the upper link.

7. The method of claim 1, further comprising using the calculated control or geometrical variables for detecting possible maladjustments by the operator and for outputting adjustment recommendations.

* * * * *